United States Patent
Kalliokoski et al.

(10) Patent No.: US 6,926,757 B2
(45) Date of Patent: Aug. 9, 2005

(54) METHOD FOR THE CONCENTRATION OF SPENT ACID

(75) Inventors: Aarno Kalliokoski, Ulvila (FI); Pauli Kuisma, Harjavalta (FI)

(73) Assignee: Outokumpu OYJ, Espoo (FI)

( * ) Notice: Subject to any disclaimer, the term of this patent is extended or adjusted under 35 U.S.C. 154(b) by 208 days.

(21) Appl. No.: 10/451,358

(22) PCT Filed: Dec. 11, 2001

(86) PCT No.: PCT/FI01/01081

§ 371 (c)(1),
(2), (4) Date: Jun. 19, 2003

(87) PCT Pub. No.: WO02/053493

PCT Pub. Date: Jul. 11, 2002

(65) Prior Publication Data

US 2004/0062707 A1 Apr. 1, 2004

(30) Foreign Application Priority Data

Dec. 20, 2000 (FI) .............................................. 20002803

(51) Int. Cl.$^7$ ........................... C01B 17/88; B03C 3/017
(52) U.S. Cl. ............................................. 95/57; 95/235
(58) Field of Search ............................ 95/57, 149, 223, 95/233, 235; 423/242.1, 522

(56) References Cited

U.S. PATENT DOCUMENTS

| | | | | |
|---|---|---|---|---|
| 2,013,753 A | * | 9/1935 | Hanh ............................... | 95/71 |
| 3,753,692 A | * | 8/1973 | Bourchier et al. ........... | 205/604 |
| 3,789,902 A | | 2/1974 | Shah et al. .................... | 159/49 |
| 3,970,511 A | | 7/1976 | Rat et al. ................... | 159/13 C |
| 4,138,231 A | * | 2/1979 | Hedenas et al. ............... | 95/196 |
| 5,122,358 A | | 6/1992 | Lailach et al. ............... | 423/522 |

FOREIGN PATENT DOCUMENTS

| | | |
|---|---|---|
| DE | 44 03 840 A1 | 8/1995 |
| DE | 198 57 015 A1 | 6/1999 |
| EP | 0 844 211 A1 | 5/1998 |

* cited by examiner

*Primary Examiner*—Frank M. Lawrence
(74) *Attorney, Agent, or Firm*—Morgan & Finnegan, LLP

(57) ABSTRACT

The invention relates to a method for the concentration of the spent acid produced in connection with the scrubbing smelter or roaster gas. The hot gas produced is scrubbed first by dry and then by wet separation, and the scrubbed gas is conducted to the manufacture of a sulfurous end product. The spent acid formed is dilute, and its sulfuric acid content is increased by making use of the thermal capacity of the actual hot gas, which comes from dry separation. Thus, by making use of the thermal capacity of the gas created in the process, it is possible to replace, at least partly, the use of evaporators.

10 Claims, 2 Drawing Sheets

METHOD FOR THE CONCENTRATION OF SPENT ACID

This application is a 371 of PCT application Ser. No. PCT/FI01/01081, filed on Dec. 11, 2001.

FIELD OF THE INVENTION

The invention relates to a method for the concentration of the spent acid produced in connection with the scrubbing smelter or roaster gas. The hot gas created is scrubbed first by dry and then by wet separation, and the scrubbed gas is conducted to the production of the sulfurous end product. The spent acid formed is dilute, and its sulfuric acid content is raised by making use of the thermal capacity of the actual hot gas, which comes from dry separation. Thus by utilizing the thermal energy of the gas created in the process, it is possible to replace, at least partly, the use of evaporators.

BACKGROUND OF THE INVENTION

The hot gas created in the smelting and roasting processes of sulfidic ores and concentrates contains mainly sulfur dioxide, heavy metals, arsenic, halogens and other compounds. It is important that the concentrate burns as completely as possible, and that the oxygen content of the exhaust gas created in the smelting or roasting process is as low as possible, because a high oxygen content in the exhaust gas leads to an increased formation of sulfur trioxide, which leads further to the creation of spent acid in connection with the gas scrubbing. It has been found out that dust, particularly copper-bearing dust, catalyses the formation of $SO_3$. Most probably $SO_3$ is created in the waste heat boiler, and in order to prevent this, it is essential that the oxygen content of the exhaust gas is low and that the amount of leakage air is as small as possible.

The scrubbing of gas created in the smelter or roaster can be divided into dry separation and wet separation. Dry separation methods are realized in connection with a smelter or roaster, in which case the gas exhausted from the furnace gas space is generally first conducted into a waste heat boiler, where a part of the gas heat content is recovered. Thereafter the gas is conducted to an electrostatic precipitator. A significant portion of the heavy metal compounds contained in the gas, excluding mercury and its compounds, separate already in connection with the cooling. The created gas is often conducted to the production of sulfuric acid, and in that case the wet separation of gas takes place in the sulfuric acid plant, in scrubbers, scrubbing towers and wet electrostatic precipitators.

The purpose of the wet scrubbing of gas is to further cool down the said gas adiabatically to a suitable temperature and simultaneously to separate from the gas both solid and volatile impurities, such as heavy metals, halogens, arsenic and selenium. In connection with the wet scrubbing, the $SO_3$ in the gas is washed from the gas as spent acid when it comes into contact with water. The quantity of created spent acid is of the order 1–4% of the amount of sulfur dioxide fed into the wet scrubbing, and its $H_2SO_4$ content is of the order 25–35 w-%, otherwise known as dilute spent acid. Wet separation generally takes place as countercurrent scrubbing so that clean water is conducted to the last scrubbing towers, from which it circulates through the scrubbing towers between, to the first tower, to which hot gas is conducted. The cooled, clean gas flow is conducted from the last tower through the wet electrostatic precipitators and drying tower to the production of end products such as sulfuric acid, liquid sulfur dioxide or elemental sulfur. The spent acid obtained from the first tower is conducted to concentration.

The spent acid formed is considered as hazardous waste due to its impurities content, and the costs incurred by waste generation should be as low as possible. The dilute spent acid should be concentrated for final treatment. Concentration is carried out with the aid of evaporators, such as vacuum evaporators and submerged evaporators, to a final concentration of about 70–80 w-% $H_2SO_4$. Generally, a vacuum evaporator is used as the first-stage evaporator, where the spent acid is concentrated to a content of about 50 w-% $H_2SO_4$. It is clear that, by using a vacuum evaporator, it is possible to concentrate to an even higher content, unless problems are caused by other factors, such as e.g. arsenic crystallization. In most cases concentration is continued by using submerged evaporators, whereupon the above-mentioned final concentration is obtained. Final treatment can be e.g. a practical application or thermal decomposition in a separate furnace. Patent publication FI-103517 describes a final treatment where concentrated spent acid is fed into a suspension smelting furnace.

SUMMARY OF THE INVENTION

With the aid of the developed method, it is possible to reduce spent acid concentration costs and to simplify the treatment processes. As described above, gas from the smelter or roaster undergoes both dry and wet separation. In connection with wet separation, the gas is cooled. However in the later stage, as the dilute spent acid is concentrated, it is heated to evaporate the water contained in the acid. In the framework of the method according to this invention, these two stages are connected so that the spent acid is concentrated by making use of the thermal capacity of the hot gas itself. The spent acid is concentrated with the aid of hot gas by conducting it to countercurrent contact with the dilute spent acid, whereupon the gas cools to a temperature corresponding to the concentrated spent acid condensation point. The essential features of the invention are shown in the enclosed claims.

The hot gas, of which the temperature is about 250–400° C., coming through the Waste heat boiler and electrostatic precipitator (dry separation) from the smelter or roaster, is cooled by bringing it into contact with dilute spent acid. Upon contact, the spent acid concentrates and the gas cools simultaneously. The relationship between the amount of hot gas and heat capacity and the amount of spent acid are the deciding factors as to how much spent acid it is possible to concentrate. In practice, the spent acid can be concentrated at least to a content of 50 w-% $H_2SO_4$, whereupon the gas cools to a temperature of 120–130° C., which is the corresponding temperature range of the boiling point of the above-mentioned spent acid and the condensation point of the gas being in balance with it. Thus the thermal energy of the gas can replace at least the use of the first evaporator, whereupon savings are made in investment, operation and energy costs. If the amount of gas and thermal energy suffices, part of the gas can be used also in further concentration, in other words can totally or partly replace the use of a submerged evaporator.

The spent acid concentration and gas cooling stage is carried out in the gas treatment process after dry separation either as a separate stage prior to the proper wet separation, or as the first Wet separation stage.

It is preferable to carry out the concentration of spent acid for example so that the concentration stage is carried out as one actual wet separation stage, where concentration takes place in one or in several so-called concentration towers. The dilute spent acid, which is formed in countercurrent gas scrubbing, and which has run to the lower part of the first scrubbing tower, the first seen in the gas flow direction, is recycled into the upper part of the concentration tower, and the hot gas is conducted to the lower part of the tower. If the spent acid is concentrated only in one tower, the gas is removed from there directly into the first scrubbing tower and the concentrated spent acid either directly to end-use or for further concentration. If there are two concentration towers, it is preferable to conduct the gas coming from the latter concentration tower first to the dewatering stage, which takes place in the scrubber, before the scrubbing towers. The spent acid obtained form the second concentration tower is ready for final treatment.

BRIEF DESCRIPTION OF THE DRAWINGS

A preferable embodiment of the invention is described with the aid of flowchart 1, and flowchart 2 illustrates the alternative where the entire spent acid concentration is carried out with the aid of hot smelter/roaster gas with the aid of two concentration towers.

DETAILED DESCRIPTION OF THE PREFERRED EMBODIMENTS

Figure 1:
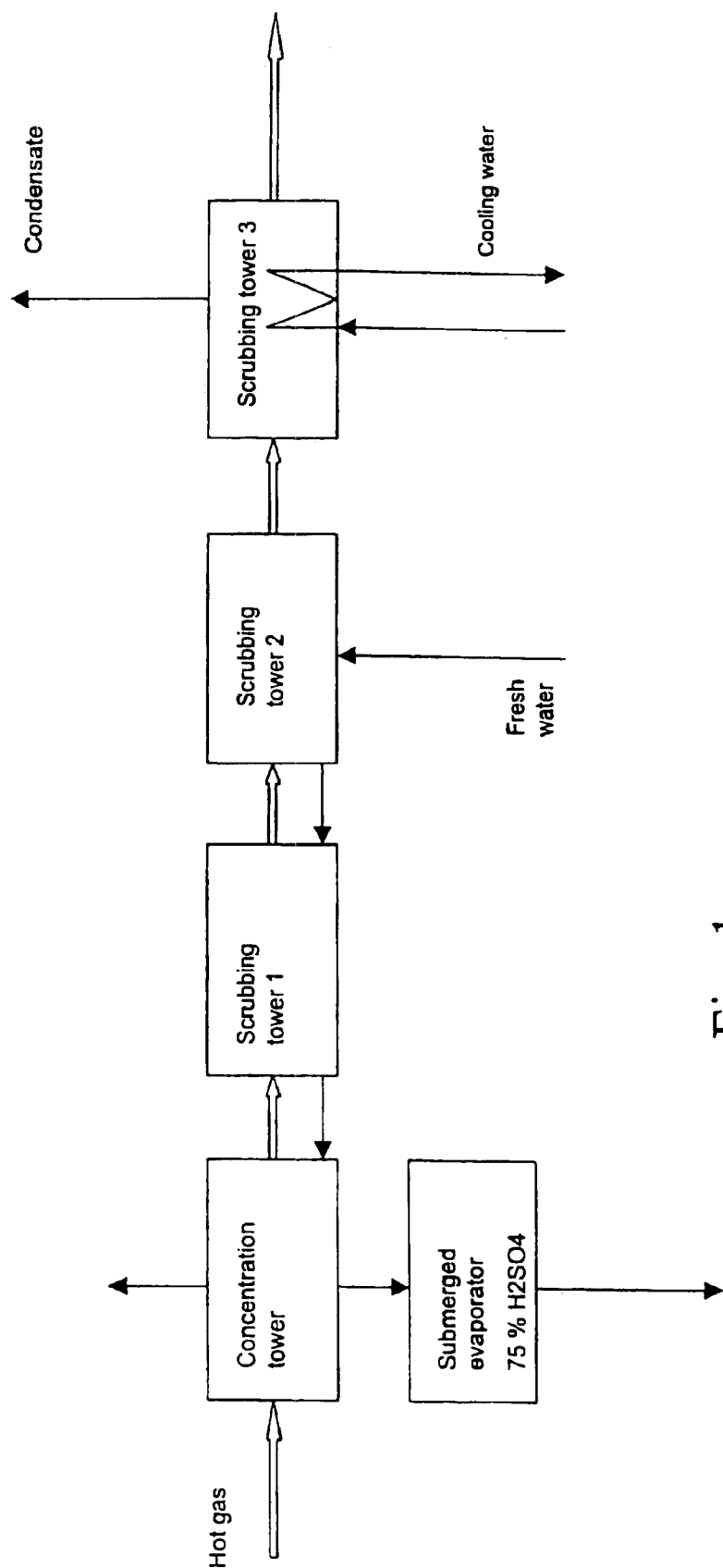

In FIG. 1, a spent acid concentration method is described as an example, wherein hot gas is conducted from the smelter or roaster via dry separation (not in the figure) to wet separation, where the gas and scrubbing liquid move in counter current. The gas flow is depicted as a wide arrow and the wash water/spent acid as a black arrow. According to the developed method, the wet scrubbing line of the gas is equipped with a concentration tower, which is placed in the scrubbing line before the first scrubbing tower. The scrubbing towers are numbered according to the flow direction of the gas. The temperature of the hot gas is about 300° C., and this is cooled by the dilute spent acid, of which the content is about 30 w-% $H_2SO_4$, obtained from the first scrubbing tower.

The amount of gas to be fed into the concentration tower is adjusted in such a way that the spent acid can be concentrated to the desired concentration, preferably e.g. to a concentration of 50 w-%, of which the boiling point is about 120–130° C. So during spent acid concentration, the gas cools down to this temperature in the concentration tower. In this method the concentration tower replaces the previously, normally used vacuum evaporator.

In order that the spent acid concentrates e.g. from a concentration of 30% to a concentration of 50% $H_2SO_4$, and that the gas cools from a temperature of 300° C. to a temperature of about 125° C., the gas and spent acid feed ratio is 6–7 m³ gas/1 kg spent acid. Thus it is possible to calculate that, for example, about 47 000 Nm³/h gas is able to concentrate about 5 m³/h spent acid.

The spent acid obtained from the concentration tower can be used as such for some beneficial purposes, as indicated by the arrow pointing upwards from the concentration tower. The spent acid can be further concentrated, as shown by the arrow pointing downwards from the concentration tower, according to which the spent acid is conducted to a submerged evaporator, where it is most generally concentrated to a content of 70–80 w-% $H_2SO_4$. The concentrated spent acid is conducted to final treatment. It should be noted that the above-mentioned content of 50 w-% is by no means the absolute limit for concentration of spent acid in a concentration tower, but if the thermal capacity of the gas and the amount of spent acid are of a suitable ratio, the spent acid can be concentrated in the same tower up to a final concentration of up to 70–80 w-% $H_2SO_4$. At a concentration of 75 w% the boiling point of the spent acid and the condensation point of the gas being in balance with it, is about 150° C.

According to standard practice, the spent acid is cooled between the evaporation stages. Now it is proven that, with the suitable technical solutions, cooling can be avoided and hot, about 50 w-% spent acid can be fed directly to further concentration, either with the aid of smelter/roaster gas or to that taking place in the submerged evaporator. Thus savings in thermal energy required are also made at this stage. If, however, the hot spent acid solution is cooled, it is worth conducting it as a bleed to a ready-cooled, larger amount of spent acid. This reduces the corrosion problem of heat exchangers.

As seen in FIG. 1, regular gas scrubbing traditionally takes place in scrubbing towers, the number of which may vary, but most commonly there are three. The fresh water used in gas scrubbing is generally conducted first to the second last, in this case to the second scrubbing tower, where dilute spent acid is formed as a result of the sulfuric acid washed from the gas. The dilute spent acid is conducted from the second tower to the first tower, where it is further concentrated to the above-mentioned approx. 30 w-% $H_2SO_4$. In the first scrubbing towers the gas cooling is adiabatic, i.e. heat is neither added into the towers nor is heat taken away, but the heat from the gas transfers to the wash water/spent acid, which vaporizes. The number of scrubbing towers must however be sufficient for the removal of halogens. In general however, three serial scrubbing stages operating on the countercurrent principle are sufficient.

In the direction of the gas flow In the last scrubbing tower, the gas or scrubbing solution is cooled with the aid of cooling water. In the last scrubbing stage the level of impurities should be sufficiently low. This can be controlled, for example, by maintaining the sulfuric acid content of the scrubbing solution at less than 1% in the last scrubbing tower in regard to the gas flow direction. The cooling water and the condensation water from the gas in the precious stage are separated from the gas and conducted to condensation treatment. The cleaned gas is conducted to the manufacturing process for the production of pure sulfuric acid or of another product.

Figure 2:
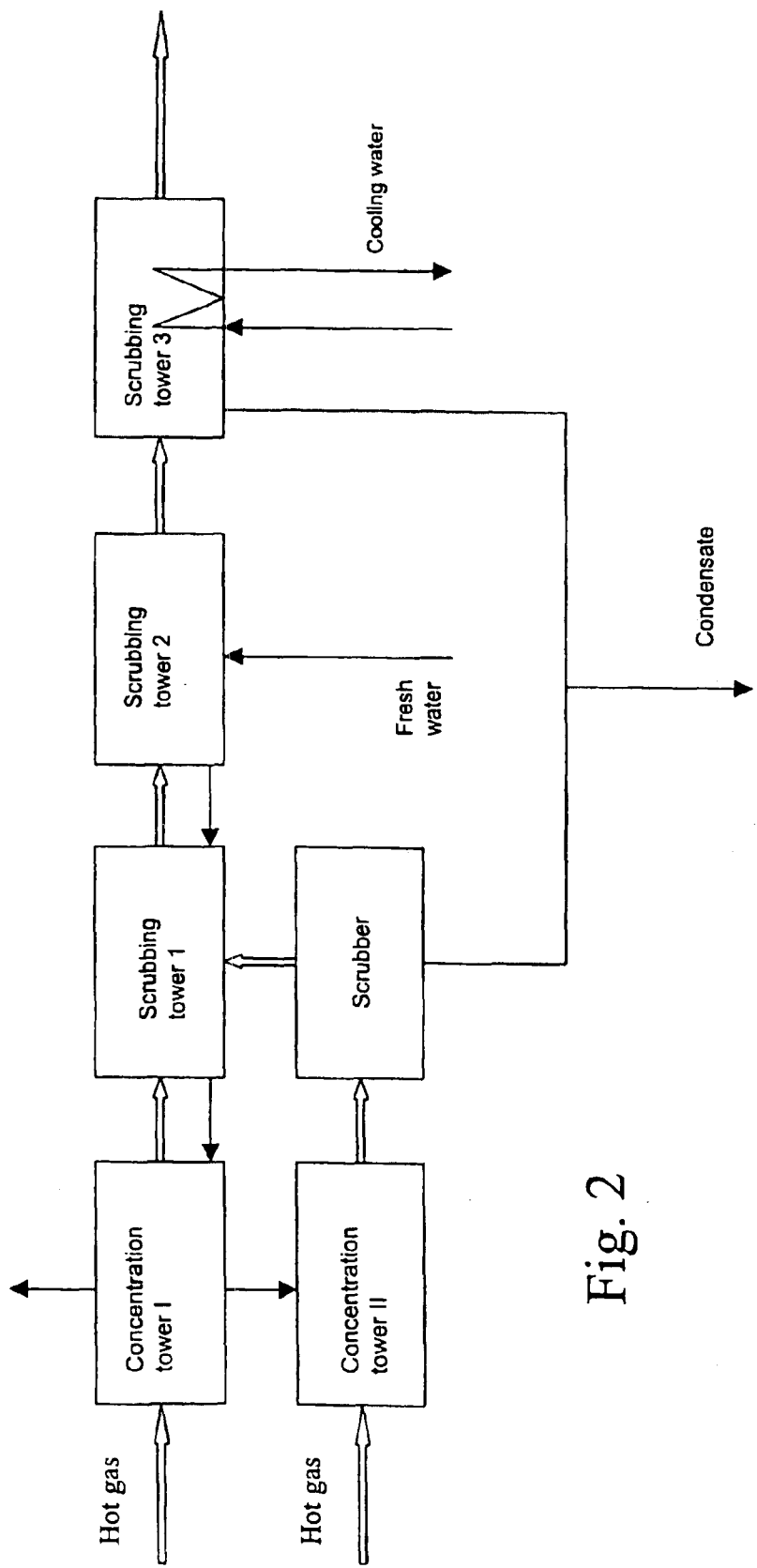

As proven above, concentration of spent acid to its final concentration can be carried out in one concentration tower. FIG. 2 shows an alternative, according to which the whole concentration of spent acid takes place with the aid of smelter gas by using two concentration towers. A part of the hot gas is conducted to concentration of the spent acid coming from wet separation in the first concentration tower, and a part of the gas is conducted to the other concentration tower, where further/extended concentration takes place. The wet gas coming from the second concentration tower is conducted to a scrubber, where condensation water is separated from the gas and the gas is conducted to the first scrubbing tower. The condensation water created can be incorporated with the condensate coming from the last scrubbing tower. By carrying out the whole concentration with the aid of the thermal capacity of the hot gas, further savings can be made also in those costs, which are commonly incurred from the use of submerged evaporators. Spent acid concentrated to a content of 70–80 w-% is conducted to final treatment. If the thermal energy of the gas is not sufficient for the whole of the final concentrated, part of the evaporation can take place, for example, in submerged evaporation.

One other equipment for the cooling of gas and for the concentration of spent acid is a quench-type scrubber, which operates as a separate unit before wet separation. The gases therein are conducted inside the lower part of the scrubber and are removed from the upper part of the scrubber. Normally, very large quantities of water are used in a quench scrubber for gas scrubbing, but when adapted for the concentration of spent acid in the scrubbing of gases, only dilute spent acid is used. Spent acid is sprayed from above, hot gas vaporizes the Water in the spent acid and concentration takes place. The gas from quench-type scrubbers is conducted to further wet separation and further concentration of spent acid.

Above is described the concentration of spent acid, with the aid of the gas obtained from the process, to a content either of 50 w-% or 70–80 w-% $H_2SO_4$ but it is clear that these are not absolute limits: spent acid can be concentrated up to a content for which the thermal energy of the gas suffices, or which is preferable for end use purposes. The above-mentioned limits are however practical limits, in as much as the spent acid is generally concentrated by vacuum evaporator to a concentration of 50 w-% and the following evaporation takes place in general to a concentration of 70–80 w-%

What is claimed is:

1. A method for the concentration of spent acid in connection with the scrubbing of gas formed in smelting or roasting processes of sulfidic ores or concentrates, the method comprising scrubbing the hot gas first by dry separation in a waste heat boiler and electrostatic precipitator and then by wet separation, in which sulfur trioxide of the gas is washed as spent acid and the scrubbed gas is conducted to final product manufacture, concentrating the spent acid by making use of the thermal capacity of the hot gas coming from the dry separation by conducting said gas to countercurrent contact with dilute spent acid and so at least partly replacing use of evaporators.

2. A method according to claim 1, further comprising concentrating the spent acid with the aid of gas at a temperature of 250–400° C., wherein said gas cools to a temperature corresponding to the boiling point of the concentrated spent acid.

3. A method according to claim 2, further comprising concentrating the spent acid to a content of about 50 w-% $H_2SO_4$ with the aid of hot gas, and cooling said by conducting it to countercurrent contact with dilute spent acid, where said gas cools to a temperature of 120–130° C.

4. A method according to claim 3, further comprising carrying out the further concentration of the spent acid from a content of 50 w-% to a content of 70–80 w-% $H_2SO_4$ at least partly, with the aid of smelter or roaster gas.

5. A method according to claim 2, further comprising concentrating the spent acid to a content of about 75 w-% $H_2SO_4$ with the aid of hot gas, and cooling said gas by conducting it to countercurrent contact with dilute spent acid, where said gas cools to a temperature of about 150° C.

6. A method according to claim 1, further comprising carrying out the spent acid concentration and the gas cooling in a concentration tower on the countercurrent principle as the first part of the wet separation stage.

7. A method according to claim 6, further comprising conducting the spent acid to be concentrated to the concentration tower from the first scrubbing tower of wet separation.

8. A method according to claim 1, further comprising carrying out the spent acid concentration and the gas cooling in several concentration towers on the countercurrent principle as the first part of the wet separation stage.

9. A method according to claim 8, further comprising conducting the cooled gas from the last concentration tower after the removal of condensation water to wet gas separation.

10. A method according to claim 1, further comprising carrying out the spent acid concentration and the gas cooling in a quench-type scrubber prior to the wet separation stage.

* * * * *